United States Patent
Kawasaki et al.

[11] Patent Number: 5,842,271
[45] Date of Patent: Dec. 1, 1998

[54] APPARATUS FOR ASSEMBLING AN ELECTRIC MOTOR EMPLOYING A CASING BODY HAVING LOW DIMENSIONAL ACCURACY

[75] Inventors: Kenji Kawasaki; Takayoshi Inoue; Yasuo Maki, all of Osaka, Japan

[73] Assignee: Daikin Industries, Ltd., Osaka, Japan

[21] Appl. No.: 858,806

[22] Filed: May 19, 1997

Related U.S. Application Data

[62] Division of Ser. No. 436,424, May 24, 1995, Pat. No. 5,661,894.

[30]     Foreign Application Priority Data

Nov. 24, 1992  [JP]  Japan ................................. 4-337906
Nov. 12, 1993  [JP]  Japan ................................. 5-307175

[51] Int. Cl.⁶ ................................................. H02K 15/14
[52] U.S. Cl. .......................... 29/732; 228/154; 310/89; 310/90; 310/91
[58] Field of Search ..................... 29/596, 732, 598; 228/184; 310/89, 90, 91, 42

[56]             References Cited

U.S. PATENT DOCUMENTS 3,165,816  1/1965  Thompson et al. .
3,172,197  3/1965  Rutledge .
5,127,148  7/1992  Lykes et al. .

FOREIGN PATENT DOCUMENTS

0302116   2/1989  European Pat. Off. .
2380658   9/1978  France .
57-183258  5/1981  Japan .
349549    7/1989  Japan .

*Primary Examiner*—Carl E. Hall
*Attorney, Agent, or Firm*—Birch, Stewart, Kolasch & Birch, LLP

[57]                ABSTRACT

There is provided an apparatus for assembling an electric motor capable of equalizing a gap formed between a stator and a rotor even when a casing body has low dimensional accuracy. In assembling an electric motor, such as an electric motor section of a scroll compressor to be employed in an air conditioner, outer diameters of bearings are made smaller than an inner diameter of the casing body. In a first assembling machine, a first bearing is welded to the casing body with a center of an inner peripheral surface of the stator aligned with a center of the first bearing. A rotary shaft around which the rotor is mounted, is inserted into a center portion of the casing body. In a second bearing assembling machine, a second bearing is welded to the casing body with the center of the first bearing aligned with a center of the second bearing. Consequently, an electric motor can be produced in which the stator, the first bearing, and the second bearing are concentrically aligned with each other.

12 Claims, 8 Drawing Sheets

APPARATUS FOR ASSEMBLING AN ELECTRIC MOTOR EMPLOYING A CASING BODY HAVING LOW DIMENSIONAL ACCURACY

This application is a divisional of U.S. patent application Ser. No. 08/436,424, filed on May 24, 1995, now U.S. Pat. No. 5,661,894, the entire contents of which are hereby incorporated by reference.

TECHNICAL FIELD

The present invention relates to an apparatus for use in assembling a variety of electric motors including an electric motor section of a scroll compressor to be employed in an air conditioner.

BACKGROUND ART

Figure 8:
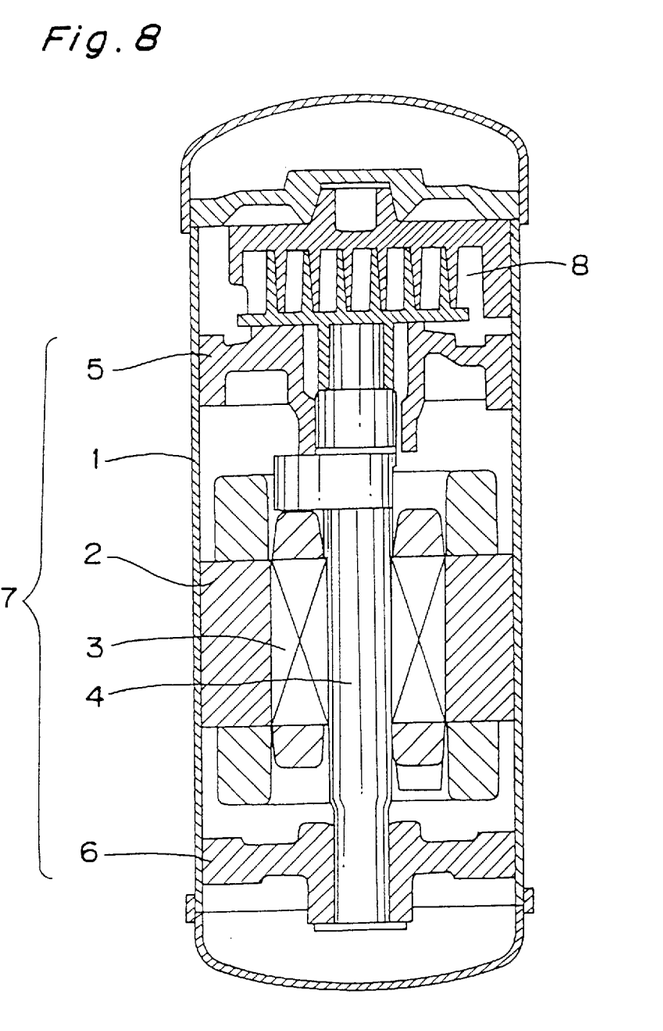
FIG. 8 is a sectional view schematically showing the construction of a scroll compressor.

A scroll compressor for use in an air conditioner has a construction as shown in FIG. 8 where a compressor section 8 is integrated with an electric motor section 7 composed of a casing body 1, a stator 2, a rotor 3, a rotary shaft 4, an upper bearing 5, and a lower bearing 6. In the electric motor section 7, the stator 2 is fixed inside the cylindrical casing body 1 by shrink fitting or a similar method. The rotor 3 is inserted in the stator 2 with a specified gap being formed between the rotor 3 and the stator 2. The rotor 3 is fixed around the rotary shaft 4 which serves as a crankshaft by press fitting the rotor 3 to the rotary shaft 4. The upper bearing 5 and the lower bearing 6 are mounted in both end portions of the casing body 1 while rotatably supporting the rotary shaft 4.

Figure 9:
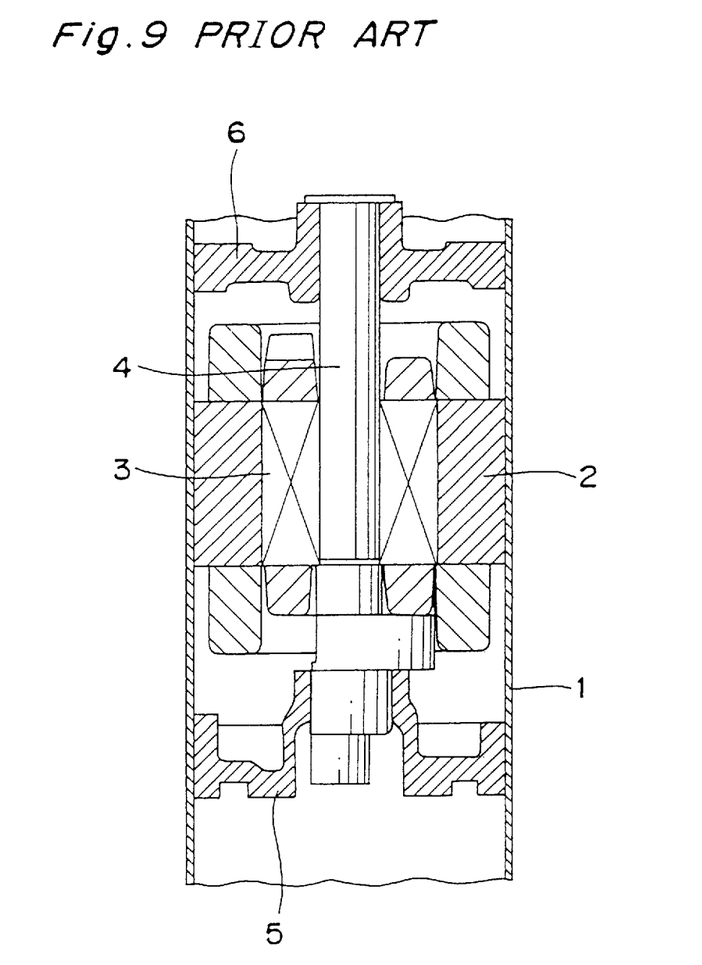
FIG. 9 is a sectional view schematically showing a conventional assembling method.

The electric motor section 7 of such a scroll compressor is assembled normally according to a procedure as shown in FIG. 9. The casing body 1 in which the stator 2 has been inserted is vertically inverted, and the upper bearing 5 is fixed into a lower end portion of the casing body 1 by welding. The rotary shaft 4 around which the rotor 3 has been mounted is inserted into a center portion of the casing body 1 with a lower end portion of the rotary shaft 4 inserted into the upper bearing 5. The lower bearing 6 is inserted into an upper end portion of the casing body 1 with an upper end portion of the rotary shaft 4 inserted into the lower bearing 6, and the lower bearing 6 is fixed by welding. The upper bearing 5 and the lower bearing 6 are both mounted to the casing body 1 with the inner peripheral surface of the casing body 1 used as a reference surface for positioning.

According to the assembling procedure described above, when the casing body is formed in a complete cylinder shape, the centers of the bearings 5 and 6 coincide with the center of the casing body 1 to achieve an even gap between the stator 2 and the rotor 3. However, the method of producing the casing body 1 has been simplified for cost reduction in a recent scroll compressor. The casing body 1 may be produced by rolling a flat plate into a cylindrical shape. The casing body 1 thus produced has a degraded dimensional accuracy into a cylindrical shape. When the bearings 5 and 6 are directly mounted to the casing body 1, the centers of the bearings 5 and 6 are displaced from the center of the stator 2, which results in an uneven gap between the stator 2 and the rotor 3 to significantly reduce the performance of the electric motor. Therefore, it is impossible to use a casing body 1 having low dimensional accuracy, which has been a cause of hampering the cost reduction of the scroll compressor.

DISCLOSURE OF THE INVENTION

Accordingly, the object of the present invention is to provide an apparatus for assembling an electric motor capable of maintaining the evenness of a gap between a stator and a rotor when a casing body has low dimensional accuracy.

In order to achieve the above-mentioned object, the present invention provides a method for assembling an electric motor wherein bearings, each having an outer diameter smaller than an inner diameter of a casing body such that a gap is formed between the bearings and the casing, are each mounted to each of both ends of the casing body in which a stator is inserted, with a rotary shaft around which a rotor is mounted being supported by the bearings at a center portion of the casing body, the method comprising: a first bearing assembling step of inserting the first bearing into a first end of the casing body in which the stator is inserted and fixed, holding the first bearing in an assembling position with the center of the first bearing placed in a specified position, and plug welding the casing body to the first bearing at a plurality of locations on an outer peripheral surface of the casing body while holding the casing body in an assembling position so that the center of an inner peripheral surface of the stator is aligned with the center of the first bearing to thereby mount the first bearing in the first end of the casing body; a rotary shaft assembling step of inserting the rotary shaft a second end of the casing body toward the center portion of the casing body and inserting a first end of the rotary shaft into the first bearing; and a second bearing assembling step of inserting the second bearing into a second end of the casing body for insertion of a second end of the rotary shaft into the second bearing, holding the casing body in an assembling position so that the center of the first bearing which has already been mounted in the first bearing assembly step is placed in a specified position, and plug welding the casing body to the second bearing at a plurality of locations on the outer peripheral surface of the casing body while holding the second bearing in an assembling position so that the center of the second bearing is aligned with the center of the first bearing to thereby mount the second bearing in the second end of the casing body.

According to the method for assembling an electric motor of the present invention, in the first bearing assembling step, the first bearing is held in the assembling position so that the center of the first bearing is placed in a specified position. Then the casing body in which the stator is inserted and fixed is held in the assembling position with the center of the inner peripheral surface of the stator aligned with the center of the first bearing. A gap is formed between an inner surface of the casing body and an outer surface of the first bearing. In the above-mentioned condition, the first bearing is plug welded to the casing body. Therefore, the first bearing and the stator are concentrically aligned with each other.

In the second bearing assembling step, the casing body is held in the assembling position so that the center of the first bearing is placed in a specified position. With the second bearing held in the assembling position and with the center of the second bearing aligned with the center of the first bearing, hereupon a gap is formed between an inner surface of the casing body and an outer surface of the second bearing. Then the second bearing is plug welded to the casing body. Therefore, the second bearing is concentrically aligned with the first bearing and the stator.

Thus the centers of both the first and second bearings are aligned with the center of the stator without being influenced by the dimensional accuracy of the casing body. In second words, the stator and the bearings are concentrically aligned with each other regardless of the dimensional accuracy of the inner peripheral surface of the casing body thus equalizing the gap formed between the stator and the rotor.

In plug welding the end portions of the casing body to the bearings at the plurality of locations on the outer peripheral surface of the casing body, the plug weldings are started simultaneously in the plurality of locations and the heat input quantity and the welding wire supply quantity in each plug welding location are the same. This allows the same welding metal solidifying process to be achieved in each welding location to prevent the possible eccentricity of the bearings at the end portions of the casing body due to an uneven solidifying process. Therefore, the concentricity of the stator and the bearings can be maintained.

The present invention also provides an apparatus for assembling an electric motor wherein bearings each having an outer diameter smaller than an inner diameter of a casing body such that a gap is formed between the bearing and the casing, are each mounted to each of both ends of the casing body in which a stator is inserted, and a rotary shaft around which a rotor is mounted is supported by the bearings at a center portion of the casing body, the apparatus comprising: a first bearing assembling machine for mounting the one bearing into an one end of the casing body in which the stator is inserted and fixed; and a second bearing assembling machine for mounting the other bearing into the other end of the casing body in which the one bearing is already mounted and in a center portion of which the rotary shaft is inserted with the rotor mounted around the rotary shaft, said first bearing assembling machine comprising a bearing positioning mechanism for holding the one bearing in an assembling position with the center of the one bearing placed in a specified position, a casing body positioning mechanism for holding in an assembling position the casing body in which the stator is inserted and fixed so that the center of an inner peripheral surface of the stator is aligned with the center of the one bearing, and a welding mechanism for plug welding the casing body to the one bearing in a plurality of positions on an outer peripheral surface of the casing body held in the assembling position, and said second bearing assembling machine comprising a casing body positioning mechanism for holding in an assembling position the casing body in which the one bearing is already mounted and the rotary shaft is already inserted so that the center of the one bearing is placed in a specified position, a bearing positioning mechanism for holding the other bearing in an assembling position so that the center of the other bearing is aligned with the center of the one bearing, and a welding mechanism for plug welding the casing body to the other bearing at a plurality portions on the outer peripheral surface of the casing body held in the assembling position.

According to the apparatus for assembling an electric motor of the present invention, in the first bearing assembling machine, the one bearing is held in the assembling position with the center of the one bearing placed in the specified position. The casing body in which the stator has been inserted is held in the assembling position so that the center of the inner peripheral surface of the stator is aligned with the center of the one bearing. Then a gap is formed between an inner surface of the casing body and an outer surface of the one bearing. In the above-mentioned condition, the one bearing is plug welded to the casing body. Therefore, the one bearing and the stator are concentrically aligned with each other.

According to the second bearing assembling machine, the casing body is held in the assembling position so that the center of the one bearing is placed in the specified position and the other bearing is held in the assembling position so that the center of the other bearing is concentrically aligned with the center of the first bearing. Then a gap is formed between an inner surface of the casing body and an outer surface of the other bearing. In this condition, the other bearing is plug welded to the casing body. Therefore, the other bearing is concentrically aligned with the one bearing and the stator.

Thus the centers of the bearings are aligned with the center of the stator without being influenced by the dimensional accuracy of the casing body. In other words, the stator and the bearings are concentrically aligned with each other regardless of the dimensional accuracy of the casing body to make even the gap between the stator and the rotor supported by the bearings via the rotary shaft.

The electric motor may include not only a general-use electric motor, but also an electric motor section of a compressor in which the casing body contains a compressor section.

It is preferred that the positioning mechanism for holding in the assembling position the casing body or each bearing inserted in the end portion of the casing body is provided with the misalignment detecting mechanism for detecting the misalignment of the positioning mechanism and the correction drive mechanism for moving the positioning mechanism so that the detected misalignment is corrected.

With the above-mentioned arrangement, even when the positioning mechanism is deformed by heat in the plug welding step, the misalignment due to the deformation is automatically canceled by the movement of the positioning mechanism.

It is also preferred that the misalignment detecting mechanism is comprised of a master bar which is mounted to the positioning mechanism as arranged in parallel with the center line of the positioning mechanism and two displacement sensors for measuring the quantity of eccentricity of the master bar in two directions which are perpendicular to each other as provided on a base of the assembling machine.

With the above-mentioned arrangement, when the positioning mechanism is misaligned by heat in the plug welding step, the master bar becomes eccentric according to the misalignment. By measuring the quantity of eccentricity of the master bar in two directions which are perpendicular to each other by the two displacement sensors, the direction and the magnitude of the above-mentioned misalignment are obtained.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 1(*a*), 1(*b*), and 1(*c*) are schematic views for explaining an exemplified method for assembling an electric motor of the present invention;

BRIEF DESCRIPTION OF THE PREFERRED EMBODIMENTS

Embodiments of the invention will now be described with reference to the accompanying drawings.

Figure 1A:
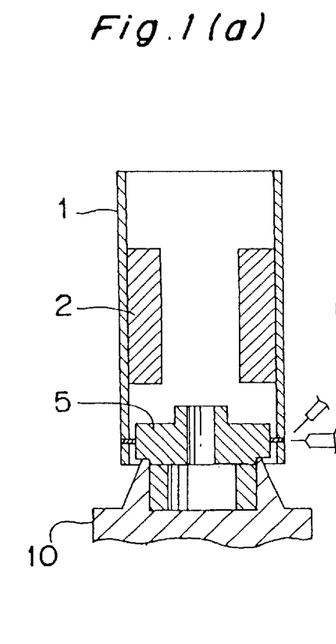
Figure 1B:
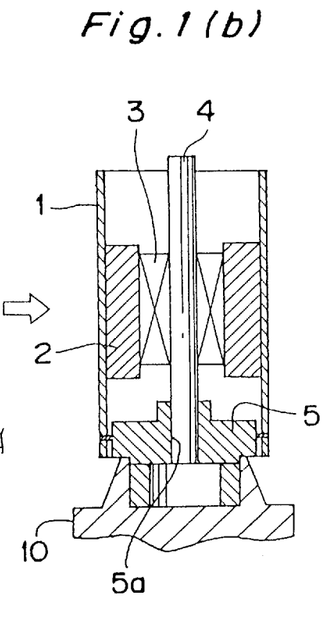
Figure 1C:
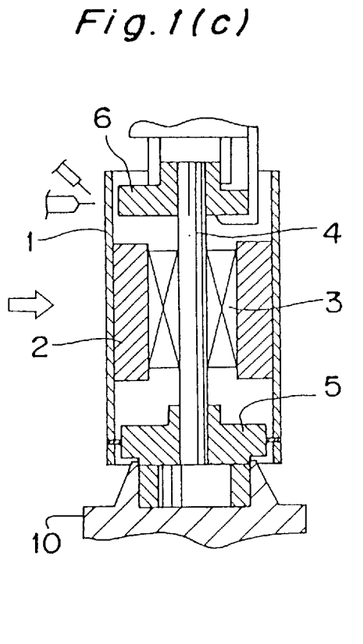

The present method for assembling an electric motor is for use in assembling an electric motor section of a scroll compressor. The method is composed of a first bearing assembling step for mounting an upper bearing 5 in a lower end portion of a casing body 1 (placed upside down) in which a stator 2 is inserted and fixed as shown in FIG. 1(a), a rotary shaft assembling step for inserting a rotary shaft 4 around which a rotor 3 is mounted and fixed into a center portion of the casing body 1 to which the upper bearing 5 has been mounted as shown in FIG. 1(b), and a second bearing assembling step for mounting a lower bearing 6 in an upper portion of the casing body 1 in which the rotary shaft 4 has been inserted as shown in FIG. 1(c).

Figure 2:
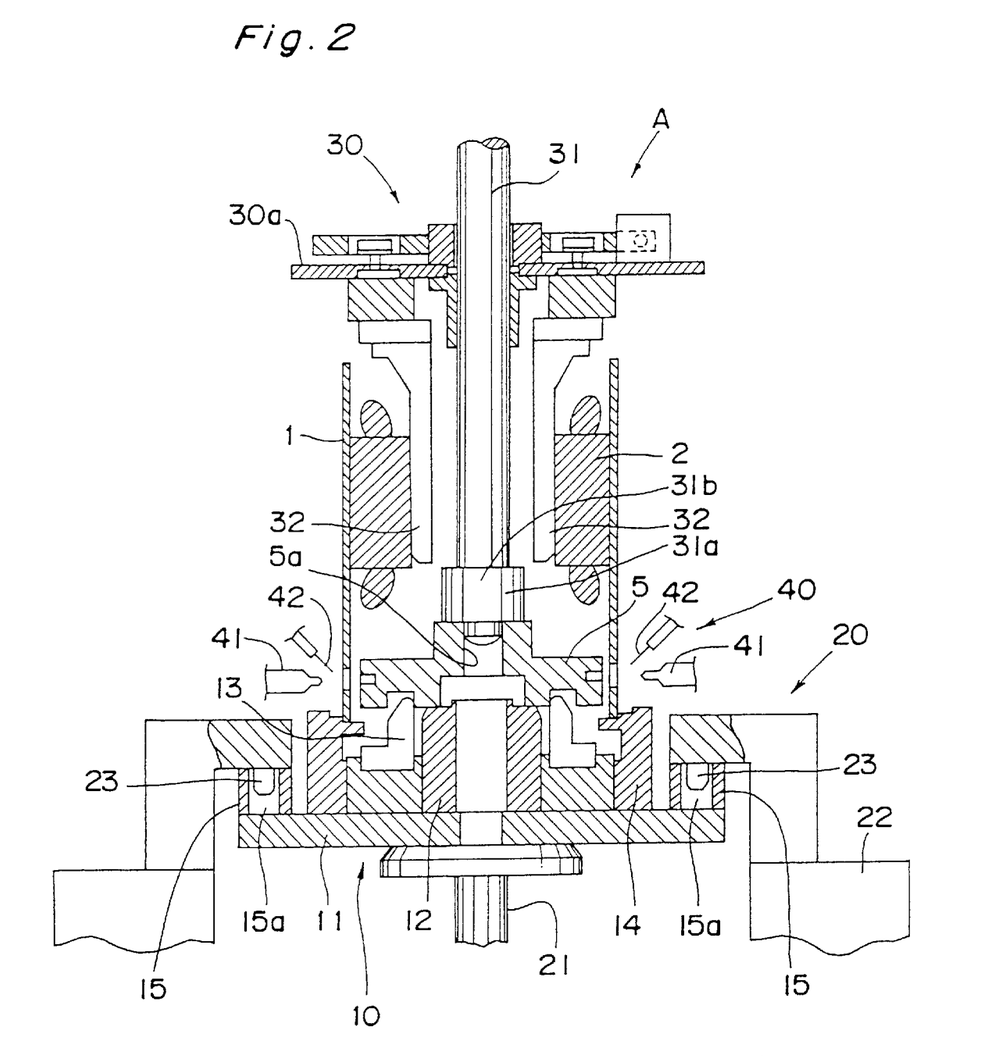
FIG. 2 is a longitudinal sectional view showing the construction of a first bearing assembling machine.
Figure 3:
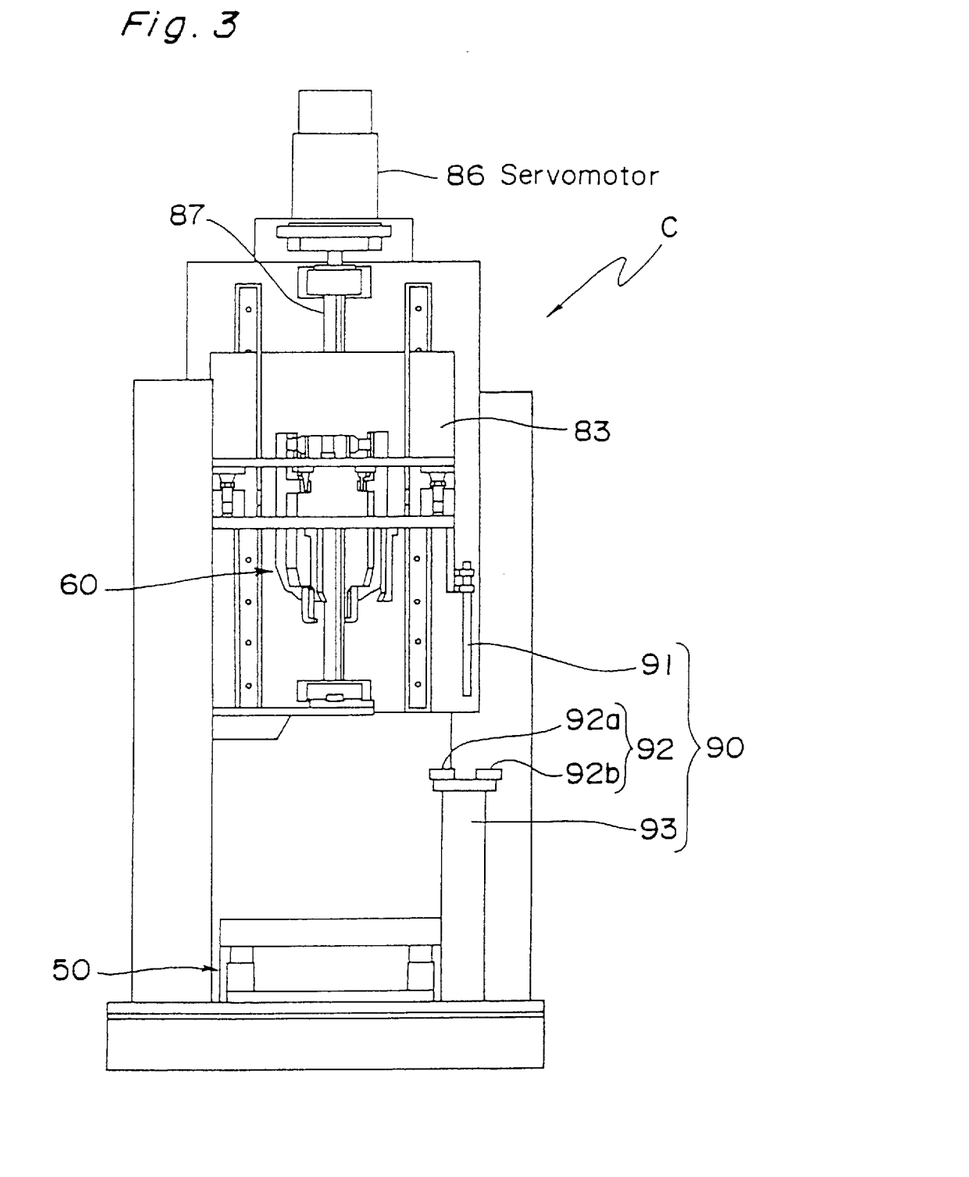
FIG. 3 is a front view showing the entire construction of a second bearing assembling machine.
Figure 4:
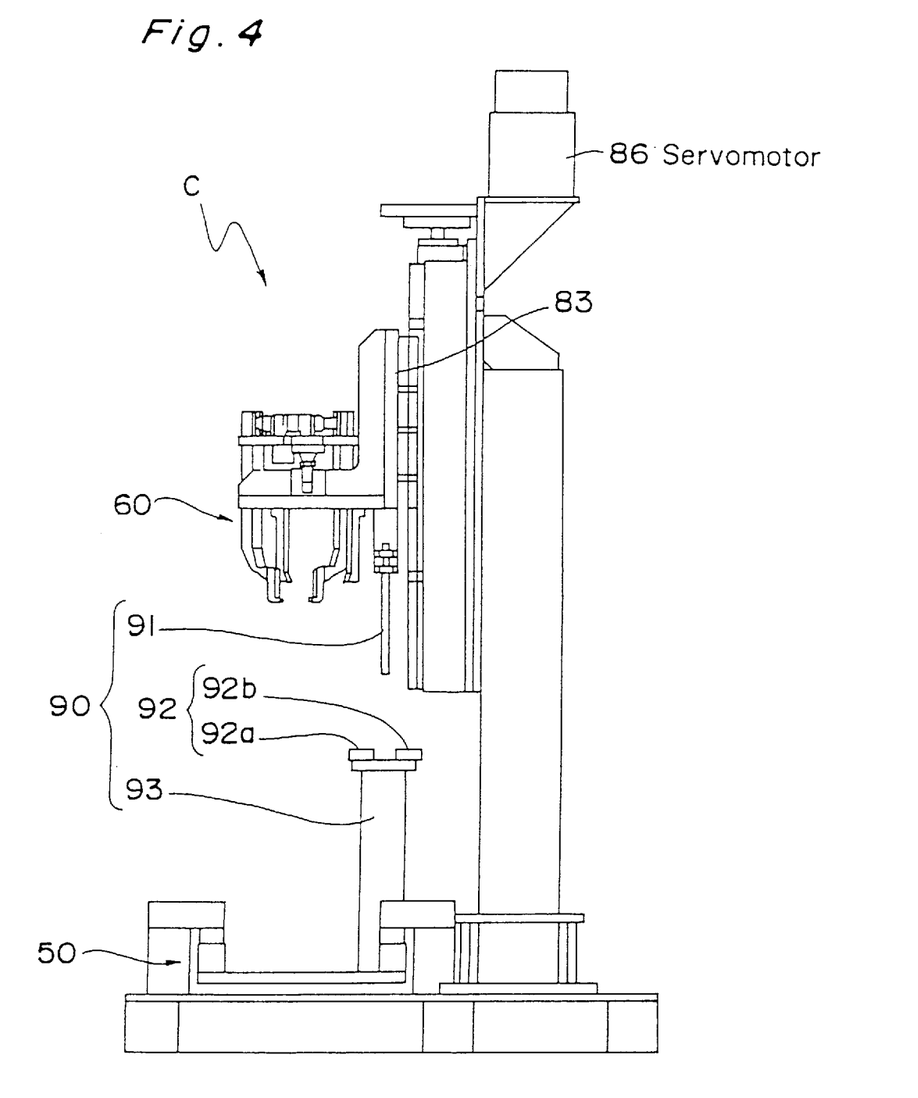
FIG. 4 is a side view showing the entire construction of the second bearing assembling machine.
Figure 5:
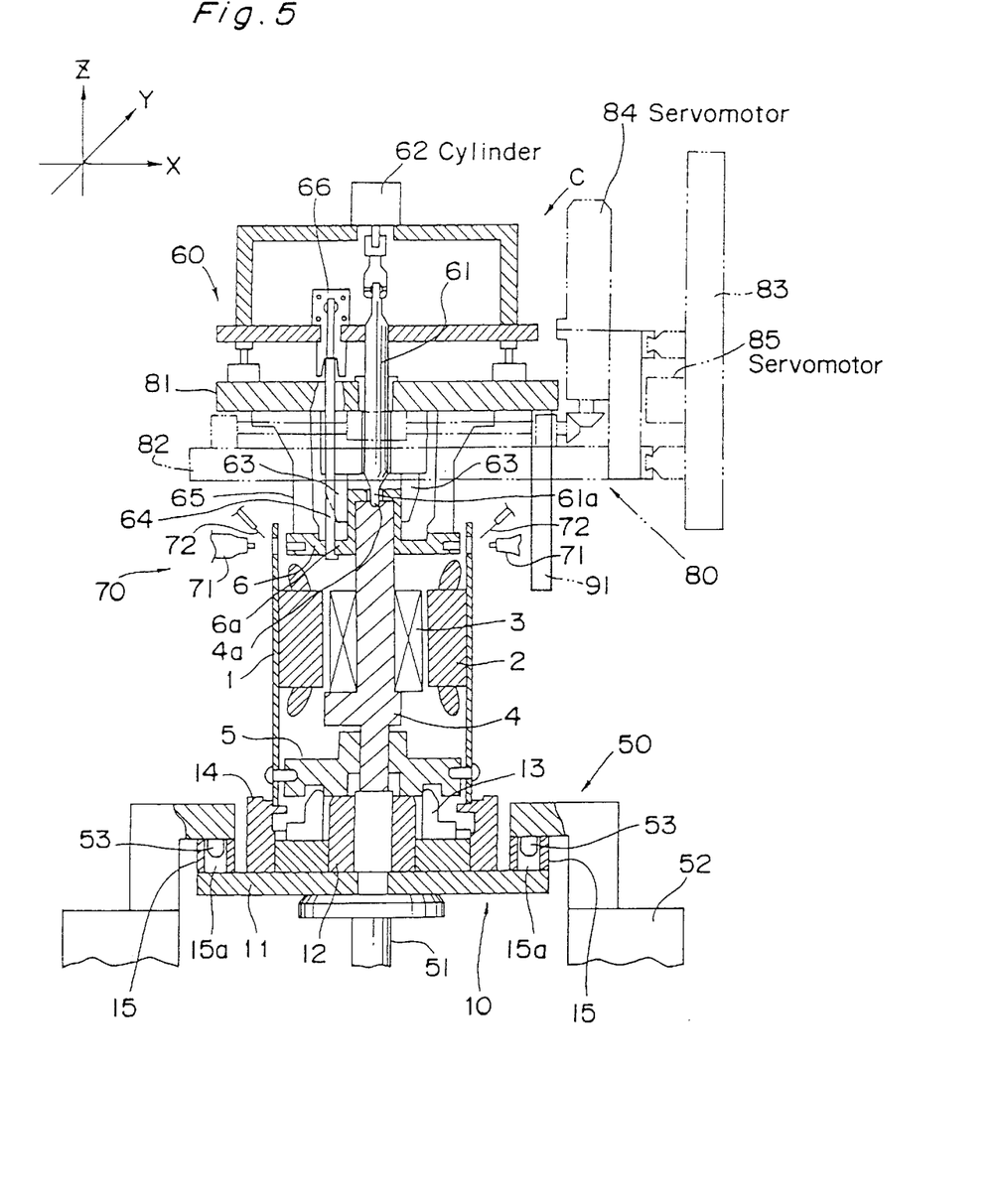
FIG. 5 is a longitudinal sectional view showing in detail the construction of a principal portion of the second bearing assembling machine.

The upper bearing 5 is transferred to a first bearing assembling machine A as shown in FIG. 2 by a pallet 10 to be mounted to the casing body 1. The casing body 1 to which the upper bearing 5 has been mounted is further mounted with the rotary shaft 4 and then transferred to a second bearing assembling machine C as shown in FIGS. 3, 4, and 5 by the pallet 10, the lower bearing 6 being mounted in the upper end portion of the casing body 1.

The inner diameter of the casing body 1 is made greater than the outer diameters of the upper bearing 5 and the lower bearing 6 to provide a gap between the inner peripheral surface of the casing body 1 and the outer peripheral surfaces of the upper bearing 5 and the lower bearing 6.

The pallet 10 has a bearing support base 12 provided projectingly from a center portion of a surface of a base plate 11 as shown in FIG. 2. The bearing support base 12 supports thereon the upper bearing 5 horizontally. The upper bearing 5 supported on the bearing support base 12 is held in a center position of the pallet 10 by chucks 13 provided around the bearing support base 12. Around the chucks 13 is provided a body support base 14 for vertically supporting thereon the casing body 1. On the periphery of the base plate 11 outwardly of the body support base 14 is fixed a member 15 having a pin hole 15 a for positioning the pallet 10.

The first bearing assembling machine A is provided, as shown in FIG. 2, with a bearing positioning mechanism 20 for holding the upper bearing 5 in an assembling position, a body positioning mechanism 30 for holding the casing body 1 in an assembling position, and a welding mechanism 40 for welding the positioned upper bearing 5 to the casing body 1.

The bearing positioning mechanism 20 has a lift unit 21 for pushing up the pallet 10 transferred to the first bearing assembling machine A. The lift unit 21 is moved up and down by, for example, an air cylinder (not shown). When the pallet 10 is pushed up by the lift unit 21, positioning pins 23 fixed to a main body base 22 are inserted into the pin hole 15a. With the above-mentioned operation, the pallet 10 is held in the assembling position of the first bearing assembling machine A, and consequently the upper bearing 5 on the pallet 10 is held in the assembling position of the first bearing assembling machine A where the center of the upper bearing 5 is placed in a predetermined position.

The body positioning mechanism 30 is entirely moved in the vertical direction and in the horizontal direction by an air cylinder (not shown), and has a pressure rod 31 vertically provided at a center portion of a main body 30a. The pressure rod 31 has at its lower end an engagement portion 31a to be closely engaged with a center hole 5a of the upper bearing 5 and a flange portion 31b which has a diameter greater than that of the engagement portion 31a and presses down the upper end of the upper bearing 5. The pressure rod 31 moves down to hold the upper bearing 5 on the pallet 10 with its engagement portion 31a and flange portion 31b. At that time, the upper bearing 5 and the pressure rod 31 are concentrically aligned with each other. Around the pressure rod 31 are provided a plurality of chucks 32. The chucks 32 move synchronously in radial directions of the pressure rod 31 by a drive section located above (not shown) to thereby hold the stator 2 from inside. Then the stator 2 is transferred to the stator assembling position of the first bearing assembling machine A to place the casing body 1 mounted around the stator 2 on the body support base 14.

The welding mechanism 40 has four welding torches 41 (only two of them are shown) arranged at intervals of 90° in the circumferential direction. The welding torches 41 are disposed outside the lower end portion of the casing body 1 placed on the body support base 14, where plug welding is performed with a wire 42 by a tungsten-inert-gas arc (TIG) welding method.

Then, as shown in FIG. 5, the rotary shaft 4 around which the rotor 3 has been mounted and fixed is inserted into the hole 5a of the upper bearing 5 fixed to the casing body 1.

The second bearing assembling machine C is provided, as shown in FIG. 5, with a body positioning mechanism 50 for holding the casing body 1 in an assembling position, a bearing positioning mechanism 60 for holding the lower bearing 6 in an assembling position, a welding mechanism 70 for welding the positioned casing body 1 to lower bearing 6, and a correction drive mechanism 80 and a misalignment detecting mechanism 90 for correcting the possible misalignment of the bearing positioning mechanism 60.

The body positioning mechanism 50 has the same construction as that of the bearing positioning mechanism 20 of the first bearing assembling machine A as shown in FIG. 5, and operates to hold the upper bearing 5 in an assembling position of the second bearing assembling machine C by positioning the aforementioned pallet 10 pushed up by a lift unit 51 by means of positioning pins 53 mounted to a main body base 52 and a pin hole 15 a. In other words, the casing body 1 is held in the assembling position of the second bearing assembling machine C so that the center of the upper bearing 5 is placed in a specified position.

The bearing positioning mechanism 60 has an aligning rod 61 at its center portion. The aligning rod 61 is moved up and down in the bearing positioning mechanism 60 by a cylinder 62, with which a small-diameter portion 61a at the lower end of the aligning rod 61 is inserted into a hole 4a provided in an end surface of the rotary shaft 4 inside the casing body 1. With the above-mentioned operation, the aligning rod 61 and the rotary shaft 4 are concentrically aligned with each other. Around the aligning rod 61 is provided a chuck 63. The chuck 63 clamps the lower bearing 6 to hold the lower bearing 6 concentrically with the aligning rod 61, i.e., in a center position of the bearing positioning mechanism 60. Around the chuck 63 are provided a plurality of lifting pawls 64 (only one of them is shown in FIG. 5) and a stop block 65. The lifting pawls 64 are moved up and down by a cylinder 66 to penetrate through a hole 6a formed in the lower bearing 6 and lift the lower bearing 6 by engaging its pawl portion with the lower surface of the lower bearing 6 to press the lower bearing 6 against the lower surface of the stop block 65.

The bearing positioning mechanism 60 is entirely moved in the vertical and horizontal directions by the correction drive mechanism 80 described hereinafter.

The welding mechanism 70 has three welding torches 71 arranged at intervals of 120° in the circumferential direction. The welding torches 71 are disposed outside the upper portion of the casing body 1 held in an assembling position of the second bearing assembling machine C and performs plug welding with a wire 72 by the TIG welding method.

The correction drive mechanism 80 has an upper table 81 movable in the direction of the y-axis in parallel with the horizontal plane, a lower table 82 movable in the direction of the x-axis which is in parallel with the horizontal plane and perpendicular to the y-axis, and a back plate 83 movable in the vertical direction of the z-axis. The upper table 81 concurrently serves as a base plate of the bearing positioning mechanism 60 and moves reciprocatingly on the lower table 82 in the direction of the y-axis while using a first servomotor 84 as a power source. The lower table 82 is supported in a cantilever fashion in front of the back plate 83 and moves reciprocatingly in the direction of the x-axis while using the second servomotor 85 mounted to the back plate 83 as a power source. The back plate 83 uses a third servomotor 86 as shown in FIGS. 3 and 4 as a power source and is moved up and down via a feed screw 87. By virtue of the upward and downward movement, the bearing positioning mechanism 60 reciprocates between an upper retreating position and a lower operating position.

The misalignment detecting mechanism 90 is composed of a vertical master bar 91 extending vertically under from a base plate of the bearing positioning mechanism 60, and two displacement sensors 92 provided on a base of the second bearing assembling machine C as shown in FIGS. 3 and 4.

The master bar 91 is positioned above the two displacement sensors 92 when the bearing positioning mechanism 60 is positioned in the upper retreating position. When the bearing positioning mechanism 60 moves to the lower operating position, a lower end portion of the master bar 91 traverses the optical axes of the displacement sensors 92. The following describes the condition where the bearing positioning mechanism 60 is in the operating position unless a special notice is provided.

Figure 6:
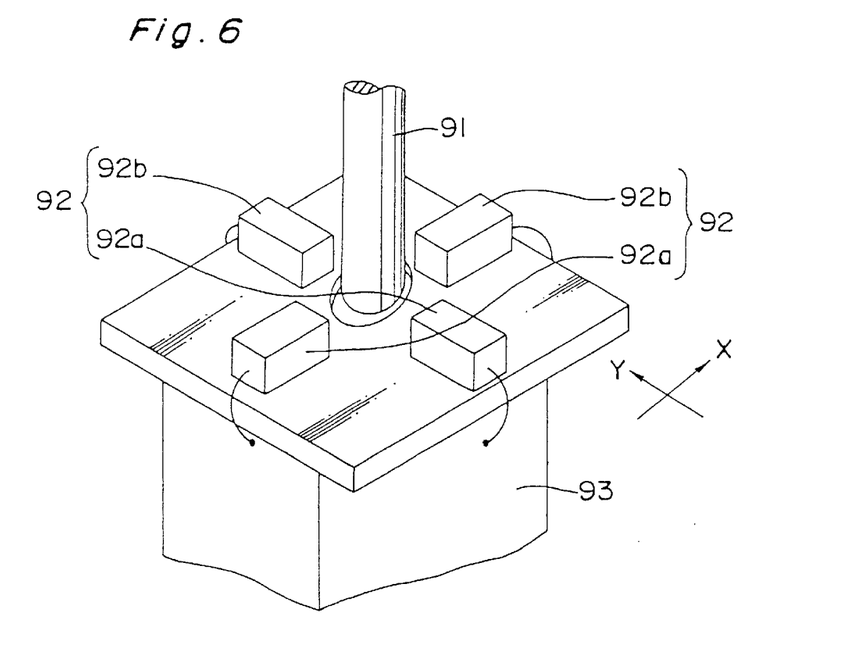
FIG. 6 is a perspective view showing the construction of a misalignment detecting mechanism.
Figure 7:
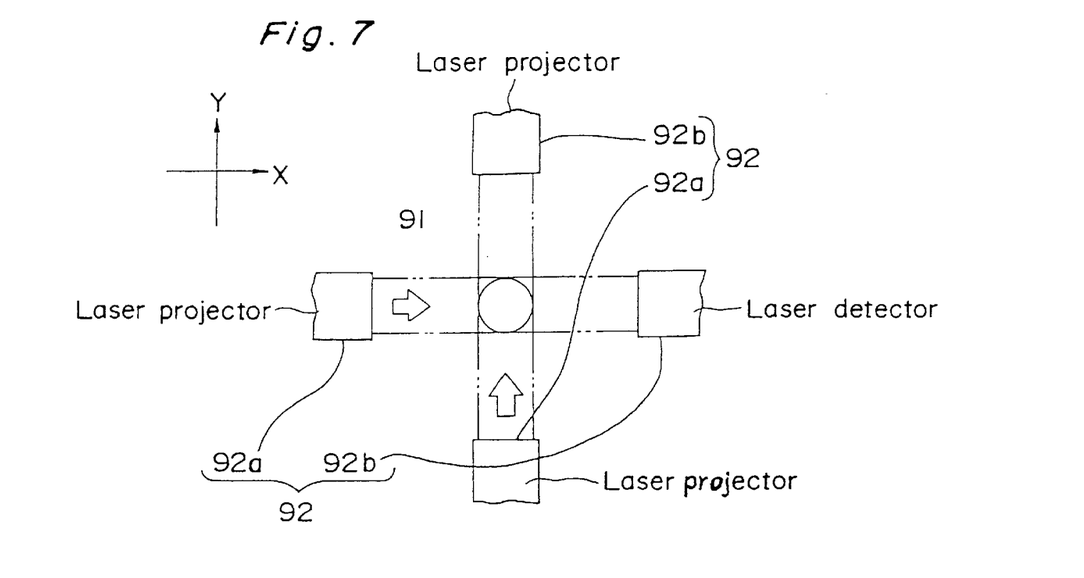
FIG. 7 is a plan view showing the construction of the misalignment detecting mechanism.

The two displacement sensors 92 are arranged on an upper surface of a frame 93 provided upright on the base of the second bearing assembling machine C. The two displacement sensors 92 are each composed of a laser projector 92a and a laser detector 92b provided at a specified interval as shown in FIGS. 6 and 7. The optical axis of one displacement sensor 92 directed in the direction of the x-axis and the other displacement sensor 92 directed in the direction of the y-axis cross each other above a center portion of the frame 93.

When no deformation takes place in the second bearing assembling machine C, the center of the master bar 91 coincides with the position at which the optical axes of the two displacement sensors 92 cross each other. As a result, laser beams from the respective laser projectors 92a are completely shaded by the master bar 91, with which the quantity of light received in the laser detector 92b is made to be zero. When the center of the master bar 91 is displaced from the position at which the optical axes of the two displacement sensors 92 cross each other, the quantity of light received in each of the laser detectors 92b increases according to the quantity of the displacement. With the above-mentioned arrangement, the quantities of eccentricity of the master bar 91 in both the direction of the x-axis and the direction of the y-axis can be obtained according to the variance in the quantity of light received in the two laser detectors 92b.

The detected quantities of eccentricity of the master bar 91 in the directions of the x-axis and the direction of the y-axis are input to a control unit (not shown). The control unit controls the servomotors 84 and 85 of the aforementioned correction drive mechanism 80 so that the quantities of eccentricity become zero.

The present apparatus for assembling an electric motor assembles the electric motor section of the aforementioned scroll compressor in a sequence as follows thereby implementing the method for assembling an electric motor of the present invention.

The upper bearing 5 is held in the center position of the pallet 10. The pallet 10 is transferred to the first bearing assembling machine A in a manner as shown in FIG. 2 and then positioned by the bearing positioning mechanism 20. With the above-mentioned operation, the upper bearing 5 is held in the assembling position of the first bearing assembling machine A so that the center of the upper bearing 5 is placed in a specified position.

When the positioning of the upper bearing 5 is completed, the casing body 1 is held in the assembling position of the first bearing assembling machine A by the body positioning mechanism 30. The casing body 1, which has been fitted with the stator 2, is held in the assembling position with the inner peripheral surface of the stator 2 clamped so that the inner peripheral surface is placed in a specified position. The upper bearing 5 is in the lower end of the casing body 1, where the center of the upper bearing 5 is aligned with the center of the stator 2. In other words, the casing body 1 and the upper bearing 5 are combined with each other with the center of the casing body 1 ignored.

When the upper bearing 5 is combined with the casing body 1, the casing body 1 is plug-welded by the TIG welding method to the upper bearing 5 simultaneously in four locations, or positions, on the outer peripheral surface of the casing body 1 by the welding mechanism 40. With the above-mentioned operation, the upper bearing 5 is mounted to the casing body 1 and concentrically aligned with the stator 2.

Since there is a gap between the casing body 1 and the upper bearing 5 during the simultaneous welding at the plurality of locations, unless the solidification of the melted metal in each welding location is completed at the same time, an eccentricity of the upper bearing 5 may be produced which moves the upper bearing 5 to the side where the solidification is first completed. Therefore, in the present embodiment, the welding is started simultaneously in each welding location, and the heat input quantity and the welding wire supply quantity in each welding location are the same. With the above-mentioned arrangement, the quantity of melted metal is the same and the solidification of the melted metal in each welding position is completed at the same time to prevent the possible occurrence of the eccentricity of the upper bearing 5, and thereby maintain the concentricity of the upper bearing 5 and the stator 2 in the casing body 1. In order to achieve the same heat input quantity, for example, the supply voltage, supply current, and weld time are the same in each welding position.

When the mounting of the upper bearing 5 is completed, the casing body 1 is transferred by the pallet 10 to a place to assemble a rotary shaft with the upper bearing 5 held on the pallet 10. Then the rotary shaft 4 to which the rotor 3 has been mounted is inserted into the center portion of the casing body 1 with its lower end inserted into the upper bearing 5.

When the insertion of the rotary shaft 4 is completed, the casing body 1 is transferred to the second bearing assembling machine C by the pallet 10. The pallet 10 transferred to the second bearing assembling machine C is positioned by the body positioning mechanism 50. With the above-mentioned operation, the casing body 1 on the pallet 10 is held in the assembling position of the second bearing assembling machine C so that the center of the upper bearing 5 and the center of the inner peripheral surface of the stator 2 are aligned with each other.

When the positioning of the casing body 1 is completed, the lower bearing 6 is held in an assembling position of the second bearing assembling machine C by the bearing positioning mechanism 60. The lower bearing 6 is inserted into the upper end portion of the casing body 1, and the upper end portion of the rotary shaft 4 is inserted into the lower bearing 6. The center of the lower bearing 6 is aligned with the center of the upper bearing 5 mounted in the lower end portion of the casing body 1. The center of the upper bearing 5 is already aligned with the center of the stator 2. Therefore, the stator 2, the upper bearing 5, and the lower bearing 6 are concentrically aligned with each other.

When the mounting of the lower bearing 6 is completed, the casing body 1 is plug-welded by the TIG welding method to the lower bearing 6 simultaneously in three locations, or positions, of the outer peripheral surface of the casing body 1 by the welding mechanism 70. In the present simultaneous welding, since there is a gap between the casing body 1 and the lower bearing 6, the welding is started simultaneously in each welding location so that the solidification process of melted metal in each welding location is the same, and the heat input quantity and the welding wire supply quantity in each welding location are the same to prevent the possible eccentricity of the lower bearing 6 with respect to the stator 2 and the upper bearing 5.

Furthermore, the welding is performed in positions close to the bearing positioning mechanism 60 in the simultaneous welding operation described above. Therefore, when the welding operation is repeated, the bearing positioning mechanism 60 may be deformed due to accumulation of welding heat. The deformation of the bearing positioning mechanism 60 results in the misalignment of the mechanism to consequently make the lower bearing 6 eccentric. However, when the bearing positioning mechanism 60 is deformed by heat, the master bar 91 of the misalignment detecting mechanism 90 becomes eccentric according to the misalignment in the present embodiment. When the master bar 91 becomes eccentric, the direction and the quantity of the eccentricity are detected by the two displacement sensors 92, and the bearing positioning mechanism 60 entirely moves in the horizontal direction so that the eccentricity is corrected. By virtue of the mechanism, there is produced no misalignment even when the bearing positioning mechanism 60 is deformed by heat. Therefore, the possible eccentricity of the lower bearing 6 due to the deformation by heat is prevented.

Thus an electric motor in which the stator 2, the upper bearing 5, and the lower bearing 6 are concentrically aligned with each other can be obtained regardless of the dimensional accuracy of the casing body 1.

Although the mechanism for preventing the eccentricity due to the deformation by heat is provided at the bearing positioning mechanism 60 in the above-mentioned embodiment, the mechanism can be provided at the body positioning mechanism 30 of the first bearing assembling machine A. The mechanism can be also provided at the bearing positioning mechanism 20 of the first bearing assembling machine A or the body positioning mechanism 50 of the second bearing assembling machine C. When the mechanism is provided at any of them, the misalignment due to the deformation by heat can be prevented.

As is apparent from the description above, according to the method for assembling an electric motor of the present invention, wherein first and second bearings each having an outer diameter smaller than an inner diameter of a casing body such that a gap is formed between the bearing and the casing, the first bearing is concentrically aligned with an inner peripheral surface of a stator when the first bearing is mounted in a first bearing assembling step. When a rotary shaft has been inserted and the second bearing is being mounted in a second bearing assembling step, the center of the second bearing and the center of the first bearing are aligned with each other via the center of the rotary shaft. By virtue of the above-mentioned arrangement, the center of the stator is aligned with the centers of the two bearings regardless of the dimensional accuracy of the casing body, with which the rotary shaft supported by the two bearings is concentrically aligned with the stator. As a result, the gap between the rotor mounted around the rotary shaft and the stator is made even to prevent the possible degradation in performance of the electric motor due to the unevenness of the gap. The above-mentioned arrangement allows a casing body having a low dimensional accuracy to be used to achieve cost reduction of the electric motor.

In plug welding the end portions of the casing body to the bearings at a plurality of locations on an outer peripheral surface of the casing body, when the plug welding operation is simultaneously started in the plurality of locations and the heat input quantity and the welding wire supply quantity in each plug welding location are the same, the possible eccentricity of the bearings due to the uneven solidification of the metal is avoided. Therefore, the evenness of the gap between the rotor and the stator is improved to further improve the performance of the electric motor.

According to the apparatus for assembling an electric motor of the present invention, wherein first and second bearings each having an outer diameter smaller than an inner diameter of a casing body such that a gap is formed between the bearing and the casing, when the one bearing is mounted by the first bearing assembling machine, the center of the first bearing and the center of the inner peripheral surface of the stator are aligned with each. Furthermore, when the second bearing is being mounted by the second bearing assembling machine after insertion of the rotary shaft, the center of the second bearing and the center of the first bearing are aligned with each other via the center of the rotary shaft. By virtue of the above-mentioned arrangement, the center of the stator is aligned with the centers of the two bearings regardless of the dimensional accuracy of the casing body, with which the rotary shaft supported by the two bearings is concentrically aligned with the stator. As a result, the gap between the rotor mounted around the rotary shaft and the stator is made even to prevent the possible degradation in performance of the electric motor due to the unevenness of the gap. The above-mentioned arrangement allows a casing body having a low dimensional accuracy to be used to achieve cost reduction of the electric motor.

When the positioning mechanism in each assembly position for holding the casing body or the bearing inserted in the end portion of the casing body is provided with the misalignment detecting mechanism for detecting the misalignment of the positioning mechanism and the correction drive mechanism for moving the positioning mechanism so that the detected misalignment is corrected, the possible misalignment of the positioning mechanism due to the deformation thereof by heat is prevented. Therefore, the evenness of the gap between the rotor and the stator is improved to further improve the performance of the electric motor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for assembling an electric motor wherein bearings each having an outer diameter smaller than an inner diameter of a casing body are each mounted to each of both ends of the casing body in which a stator is inserted, and a rotary shaft around which a rotor is mounted is supported by the bearings at a center portion of the casing body, the apparatus comprising:

a first bearing assembling machine for mounting the one bearing into an one end of the casing body in which the stator is inserted and fixed; and a second bearing assembling machine for mounting the second bearing into the second end of the casing body in which the one bearing is already mounted and in a center portion of which the rotary shaft is inserted with the rotor mounted around the rotary shaft, said first bearing assembling machine comprising a bearing positioning mechanism for holding the one bearing in an assembling position with the center of the one bearing placed in a specified position, a casing body positioning mechanism for holding in an assembling position the casing body in which the stator is inserted and fixed so that the center of an inner peripheral surface of the stator is aligned with the center of the one bearing, and a welding mechanism for welding the casing body to the one bearing in a plurality of positions on an outer peripheral surface of the casing body held in the assembling position, and said second bearing assembling machine comprising a casing body positioning mechanism for holding in an assembling position the casing body in which the one bearing is already mounted and the rotary shaft is already inserted so that the center of the one bearing is placed in a specified position, a bearing positioning mechanism for holding the one bearing in an assembling position so that the center of the other bearing is aligned with the center of the one bearing, and a welding mechanism for welding the casing body to the second bearing at a plurality of positions on the outer peripheral surface of the casing body held in the assembling position.

2. An apparatus for assembling an electric motor as claimed in claim 1, wherein the electric motor is an electric motor section of a compressor of which casing body contains a compressor section.

3. An apparatus for assembling an electric motor as claimed in claim 1, wherein the positioning mechanism for holding the casing body or the bearings inserted in the casing body in the corresponding assembling position is provided with a misalignment detecting mechanism for detecting misalignment of the positioning mechanism and a correction drive mechanism for moving the positioning mechanism so that the detected misalignment is corrected.

4. An apparatus for assembling an electric motor as claimed in claim 2, wherein the positioning mechanism for holding the casing body or the bearings inserted in the casing body in the corresponding assembling position is provided with a misalignment detecting mechanism for detecting misalignment of the positioning mechanism and a correction drive mechanism for moving the positioning mechanism so that the detected misalignment is corrected.

5. An apparatus for assembling an electric motor as claimed in claim 3, wherein the misalignment detecting mechanism is comprised of a master bar which is mounted to the positioning mechanism as arranged in parallel with a center line of the positioning mechanism and two displacement sensors for measuring quantity of eccentricity of the master bar in two directions which are perpendicular to each other, the displacement sensors being provided on a base of the assembling machine.

6. An apparatus for assembling an electric motor as claimed in claim 4, wherein the misalignment detecting mechanism is comprised of a master bar which is mounted to the positioning mechanism as arranged in parallel with a center line of the positioning mechanism and two displacement sensors for measuring quantity of eccentricity of the master bar in two directions which are perpendicular to each other, the displacement sensors being provided on a base of the assembling machine.

7. An apparatus for assembling an electric motor wherein first and second bearings, each having an outer diameter smaller than an inner diameter of a casing body such that a gap is formed between the bearings and the casing, are each mounted to each of both ends of the casing body in which a stator is inserted, with a rotary shaft around which a rotor is mounted being supported by the bearings at a center portion of the casing body, the apparatus comprising:

a first bearing assembling machine for mounting the first bearing into a first end of the casing body in which the stator is inserted and fixed; and a second bearing assembling machine for mounting the second bearing into a second end of the casing body in which the first bearing is already mounted and in a center portion of which the rotary shaft is inserted with the rotor mounted around the rotary shaft, said first bearing assembling machine comprising a bearing positioning mechanism for holding the first bearing in an assembling position with the center of the first bearing placed in a specified position; a casing body positioning mechanism for holding the casing body, in which the stator is inserted and fixed, in an assembling position so that the center of an inner peripheral surface of the stator is aligned with the center of the first bearing, and a welding mechanism for plug welding the casing body to the first bearing in a plurality of locations on an outer peripheral surface of the casing body, and said second bearing assembling machine comprising a casing body positioning mechanism for holding the casing body, in which the first bearing is already mounted and the rotary shaft is already inserted, so that the center of the first bearing is placed in a specified position; a bearing positioning mechanism for holding the second bearing in an assembling position so that the center of the second bearing is aligned with the center of the first bearing; and a welding mechanism for plug welding the casing body to the second bearing at a plurality of locations on an outer peripheral surface of the casing body.

8. The apparatus for assembling an electric motor as claimed in claim 7, wherein the electric motor is an electric motor section of a compressor, and wherein the casing body contains a compressor section.

9. The apparatus for assembling an electric motor as claimed in claim 7, wherein the positioning mechanism for holding the casing body or the first and second bearings inserted in the casing body in the corresponding assembling position includes:

a misalignment detecting mechanism for detecting misalignment of the positioning mechanism; and a correction drive mechanism for moving the positioning mechanism so that the detected misalignment is corrected.

10. The apparatus for assembling an electric motor as claimed in claim 8, wherein the positioning mechanism for holding the casing body or the first and second bearings inserted in the casing body in the corresponding assembling position includes:

a misalignment detecting mechanism for detecting misalignment of the positioning mechanism; and a correction drive mechanism for moving the positioning mechanism so that the detected misalignment is corrected.

11. The apparatus for assembling an electric motor as claimed in claim 9, wherein the misalignment detecting mechanism includes:

a master bar which is mounted to the positioning mechanism and arranged in parallel with a center line of the positioning mechanism; and two displacement sensors for measuring a quantity of eccentricity of the master bar in two directions which are perpendicular to each other, the displacement sensors being provided on a base of the assembling machine.

12. The apparatus for assembling an electric motor as claimed in claim 10, wherein the misalignment detecting mechanism includes:

a master bar which is mounted to the positioning mechanism and arranged in parallel with a center line of the positioning mechanism; and two displacement sensors for measuring a quantity of eccentricity of the master bar in two directions which are perpendicular to each other, the displacement sensors being provided on a base of the assembling machine.

* * * * *

UNITED STATES PATENT AND TRADEMARK OFFICE
CERTIFICATE OF CORRECTION

PATENT NO. : 5,842,271
DATED : Dec. 1, 1998
INVENTOR(S) : Kawasaki et al.

It is certified that error appears in the above-identified patent and that said Letters Patent is hereby corrected as shown below:

On the title page, in item [62] Related U.S. Application Data, change "Division of Ser. No. 436,424, May 24, 1995, Pat. No. 5,661,894", to -- Division of Serial No. 08/436,424 filed May 24, 1995, now U.S. Patent No. 5,661,894, which was the national stage of international application number PCT/JP93/01697, filed November 19, 1993. --

Signed and Sealed this
First Day of February, 2000

*Attest:*

Q. TODD DICKINSON

*Attesting Officer*  *Acting Commissioner of Patents and Trademarks*